No. 804,045. PATENTED NOV. 7, 1905.
A. F. RIETZEL.
ELECTRIC WELDING CLAMPING DEVICE.
APPLICATION FILED NOV. 16, 1903.
2 SHEETS—SHEET 2.
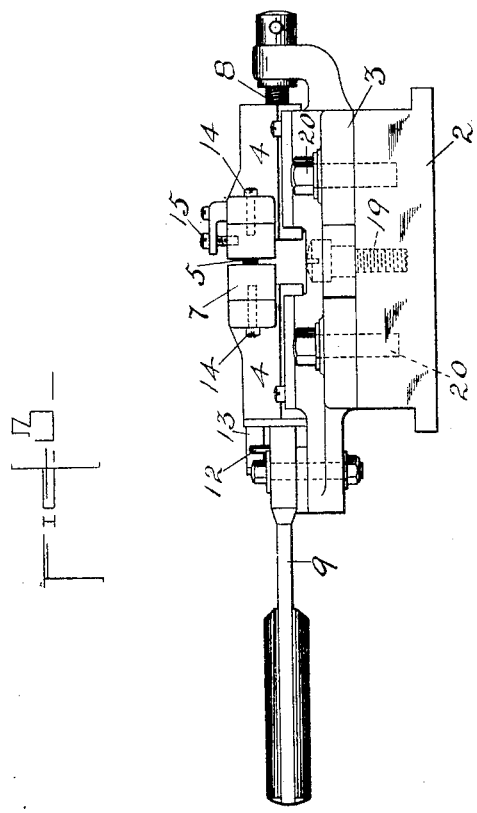
INVENTOR
Adolph F. Rietzel.
BY
Townsend Decker
ATTORNEYS
WITNESSES:

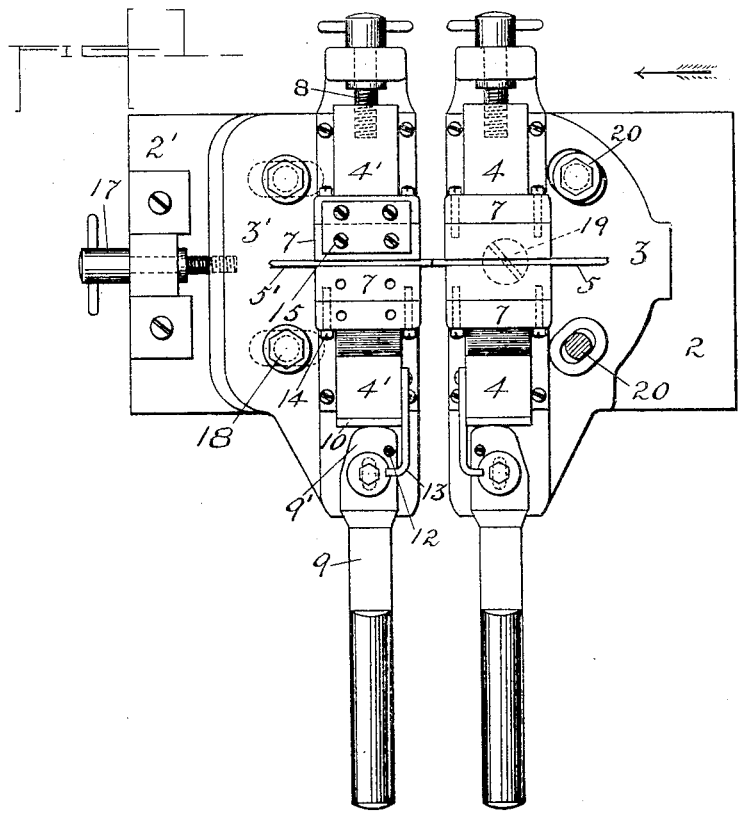

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

ELECTRIC WELDING CLAMPING DEVICE.

No. 804,045.      Specification of Letters Patent.      Patented Nov. 7, 1905.

Application filed November 16, 1903. Serial No. 181,420.

*To all whom it may concern:*

Be it known that I, ADOLPH F. RIETZEL, a citizen of the United States, and a resident of Lynn, in the county of Essex and State of Massachusetts, have invented a certain new and useful Improvement in Electric Welding Clamping Devices, (Universal Adjustment,) of which the following is a specification.

My invention relates to that class of metal-working apparatus in which the metal is heated by an electric current while held in suitable clamping or holding devices properly constructed or mounted to permit them to be moved toward one another for the purpose of applying pressure to the heated metal.

My invention is especially useful for that class of electric metal-working apparatus in which a welding or upsetting operation is carried on and in which the heated section of work is heated to the desired temperature by electric currents of large volume and low electromotive force passed through the work located in the space between two pairs of clamping-jaws or similar devices.

The primary object of my invention is to provide means whereby any desired relation or adjustment of the pairs of clamping devices may be secured in order to adjust or determine their alinement. In electric welding operations this is a very necessary feature of the machine, since the pieces to be welded must, especially with delicate work, be placed in perfect alinement in order to obtain good results. Hence in this class of machines provision is made for adjustability of the clamps in all directions, while at the same time securing the necessary rigidity and the necessary contact-surfaces between the parts which move one upon the other. Heretofore such adjustments as have been made to accomplish the desired results have been obtained by making the copper jaws or clamps proper adjustable. As these jaws are comparatively small, they soon wear and have to be replaced, while, moreover, the contact-surfaces being small are caused to heat readily. In my present invention I secure the desired adjustment and alinement of the clamping devices not by adjusting the clamp-jaws themselves, but by mounting them upon suitable clamp bodies or frames, which in turn are adjustable upon the current-supplying platen or block, but in a direction transverse to the line of pressure applied to the heated work and preferably, also, in a line which is transverse as well to the line of clamping pressure.

My invention consists, further, in the details of construction and preferred arrangements of devices whereby the desired adjustment may be accomplished.

My invention consists, further, in mounting the clamp-body carrying the clamp-jaws on an axis which permits said clamp-body to turn and change the line on which the work held by it is presented to the portion of work in the opposite pair of clamping-jaws.

My invention consists, further, in the means for supporting the clamp-jaw proper upon the jaw-carrying slide or block to permit it to be readily detachable, as also to secure a capacity for adjustment of said jaw upon the block or slide in a direction transverse to the line of pressure applied to the heated work.

In the accompanying drawings, Figure 1 is a plan view of apparatus embodying my invention. Fig. 2 is an end elevation of the same. Fig. 3 is a side elevation.

Referring to the drawings, 2 2' indicate the two blocks or platens of an electric metal-working apparatus. These blocks or platens are located upon or are in electrical union with the terminals 1 1 of any source of heating-current, which may be the secondary of a suitable transformer, as well understood in the art, or other desired source. Means as usual in the art are provided for forcing one platen toward the other—as, for instance, the right-hand platen 2 in the direction of the arrow, Fig. 1—to apply pressure to the heated work. These devices and the means guiding or immediately supporting either or both platens or for adjusting the same in the direction of the pressure are not shown herein, as they form no part of my present invention.

3 3' indicate, respectively, the right and left hand clamp bodies or blocks, which carry, respectively, the opposite work-holders or clamping devices proper, said work-holders or clamping devices being constructed to permit the work to be readily inserted and removed and to be firmly held during the metal-working operation. It is preferred to employ for these clamping or work-holding devices the construction herein particularly described, although so far as the manner of mounting and adjusting the clamp bodies or frames 3 3' is concerned my invention obviously does not depend upon the use of any particular kind of clamping-jaws or means for actuating and guiding the same to clamp or free the work. Referring first to the left-hand clamp-body 3', the same is shown as provided with two jaw-bearing slides or blocks 4', movable toward one another to clamp the work, here shown as consisting of a piece of wire 5', which is to be welded to a similar piece 5, clamped between the jaws of jaw-bearing slides 4 4 on the opposite clamp-body. These slides or blocks 4' are preferably both movable in suitable guideways formed in the clamp-body 3', which guides may be of any suitable form and are provided, as more clearly shown in Fig. 2, with the guide-plates 6, secured to the upper edge of the ways in which the blocks 4' slide and adapted to hold the same in place. Upon the ends of the slides or blocks 4' are the jaws proper, 7, which immediately engage the work. The adjustment of the slides and jaws with relation to the work held between them in the direction of the clamping pressure is secured in the case of one of the jaws by means of a suitable adjustment-screw 8, this adjustment being a slow adjustment or one for different kinds or characters of work. The adjustment of the other jaw for quickly clamping and unclamping the work by the operator is effected in any desired manner—as, for instance, by means of the cam-lever 9, carrying the cam 9', engaging the wear-plate 10 upon the end of the jaw-bearing slide. The turning of the lever in one direction applies pressure by the cam to clamp the work. By turning the lever in the other direction the pin 12 thereon is caused to engage a hook 13, carried by the slide or block 4', so as to positively free the jaw from the work. Obviously other means might be used for clamping and unclamping the successive pieces of work to be operated upon. The jaws themselves may be detachably secured to the jaw-carrying blocks or slides by means of the screws 14, which pass into the jaw proper from the rear of the slide, preferably through vertically-elongated openings in the slide, so that the position of the jaw vertically or in a line transverse to the line of pressure applied to the heated section of work may be varied. I do not limit myself, however, to the use of a detachable jaw secured in this particular manner. The adjustment vertically of said jaw may be effected by one or more screws 15, which pass through an overhanging plate secured to or forming a part of the jaw-carrying slide and engage with a jaw at its top, as shown more clearly in Fig. 3. In the case of the left-hand clamp-body 3', which, as usual in the art, is in electrical connection with the platen 2', I provide means for adjusting said clamp-body as a whole with its pair of clamping-jaws mounted on it in the manner described or in any other suitable manner. This adjustment of the clamp-body proper is in a line transverse to the line of welding pressure for the purpose of varying the position of the line of clamping with reference to the line of clamping effected by the opposite pair of jaws. Preferably this transverse adjustment of the clamp-body is in a vertical line with relation to the platen 2', or, in other words, is transverse not only to the line of pressure applied to the heated work, but to the line of clamping pressure for the pair of jaws carried by said clamp-body 3'. To effect such transverse adjustment, I prefer to employ the following devices, which while providing the proper adjustment also insure good electrical connection between the clamp-body and the platen:

16 indicates a plate having opposite bearing-surfaces which form an angle to one another and which plate is capable of sliding upon the face of the platen 2' and of supporting the clamp-body by correspondingly-inclined bottom surfaces, as shown more clearly in Fig. 2, so that by longitudinal adjustment of the wedge-shaped or inclined-plane plate 16 the position of the clamp-body may be changed vertically. This adjustment of the plate 16 is preferably effected by means of a screw 17, mounted in suitable bearings on the platen. The clamp-body is itself guided on suitable pins 18, which are mounted in the platen 2' and which may also perform the office when provided with suitable heads of clamping the parts down in any adjusted position. These pins 18 pass through openings in the plate 16, which are elongated in the direction of adjustment of said plate. As will be obvious, it is simply necessary to loosen the screw-pins 18 and turn the adjusting-screw 17 in either direction, as may be desired, to change the position of the clamp-jaws 7, carried by clamp-body 3', with reference to the clamp-jaws carried by the opposite clamp-body 3. When the proper adjustment has been secured, the screws 18 are tightened to hold the parts firmly in the desired relative position.

The right-hand body 3 may be mounted, as shown, upon a pin 19 to be permitted to be turned upon the vertical axis or axis transverse to the line of pressure applied to the heating section of work. Preferably this axis is so arranged as to be also transverse to the axis or line of clamping pressure applied by the clamping device carried by said clamp-body 3. The pin or pivot 19 may be a screw pin or pivot mounted in the platen 2 and serving likewise, if desired, as a means for fixing said clamp-body in the position in which its clamping-jaw and the work carried thereby shall keep the desired angular relation to the opposite pair of clamping-jaws and section of work carried by the latter, or, if desired, and preferably, supplemental clamp-screws (indicated at 20) may be employed for the purpose of fixing the clamp-body in the desired position.

I claim as my invention—

1. In an electric metal-working apparatus, the combination of a clamp body or frame carrying a pair of clamping-jaws for holding the work, a block or platen forming the terminal of a source of heating-current and supporting said clamping-body, and means for adjusting said clamping body or frame upon said block or platen in a line transverse to the line of pressure applied to the work.

2. In an electric metal-working apparatus, the combination of a clamp body or frame carrying a pair of clamping-jaws, a block or platen forming the terminal of a source of heating-current and supporting said clamping-body and means for adjusting said clamping body or frame upon said block or platen vertically with relation to said current-supplying block or platen.

3. In an electric metal-working apparatus, the combination of the current-supplying block or platen, and a clamp body or frame carrying a pair of clamping jaws or devices for holding the work, and a pair of supporting and guiding pins upon which said clamp-body is vertically adjustable to and from the current-supplying block or platen.

4. In an electric metal-working apparatus, the combination of a current-supplying block or platen, a clamp-body carrying adjustable clamp-jaws for grasping or holding the work, and a supporting-block for said clamp-body said supporting-block having an inclined bearing-face and being combined with means for adjusting it longitudinally upon the platen to vary the position of the clamp-jaws.

5. In an electric metal-working apparatus, the combination with a clamp-body provided with a pair of clamp-jaws for holding the work, of a current-supplying block or platen, a guide pin or pins projecting from the latter through the clamp-body, and a wedge-shaped support-plate for said clamp-body longitudinally adjustable on the platen.

6. In an electric metal-working apparatus, the combination with a clamp-body provided with a pair of clamp-jaws for holding the work, of a current-supplying block or platen, a guide pin or pins projecting from the latter through the clamp-body, and a wedge-shaped support-plate for said clamp-body longitudinally adjustable on the platen and provided with the elongated openings through which said guide-pins pass.

7. In an electric metal-working apparatus, the combination of a clamp body or frame carrying a pair of clamping-jaws and means for actuating the same to clamp the work, of a support-plate for said clamp-body having an inclined bearing-face, a current-supplying block or platen upon which said plate rests, means for adjusting the plate on the platen to vary the height of the clamp-body, and guide-pins for the clamp-body and projecting from the platen through the adjustable plate and clamp-body, as and for the purpose described.

8. In an electric metal-working apparatus, the combination of a clamp-body provided with guideways, a pair of jaws carrying slides mounted thereon, means for actuating a slide to clamp and unclamp the work, a supporting platen or block through which current is supplied to the clamp-body and means for adjusting the clamp-body vertically upon said platen or block.

9. In an electric metal-working apparatus, jaw-carrying slides or blocks adjustable transversely to the line of pressure and mounted upon a clamp-body carried by a current-supplying block or platen and vertically adjustable on said platen.

10. In an electric metal-working apparatus, a jaw-carrying slide or block, means for actuating the same to cause it to engage the work and a clamp-jaw on said block or slide adjustable in a line transverse to the line of pressure applied to the slide or block for the purpose of clamping the work.

11. In an electric metal-working apparatus, the combination of a jaw-carrying block or slide of a clamp-jaw detachably secured thereto by means of two or more clamp-screws passing into the jaw from the rear of the slide and through enlarged openings permitting a vertical adjustment of the clamp-jaw proper upon its support.

12. In an electric metal-working apparatus, the combination of a jaw-carrying block or slide, and a clamp-jaw detachably secured thereto by means of two or more clamp-screws passing into the jaw from the rear of the slide and through enlarged openings permitting a vertical adjustment of the clamp-jaw proper upon the clamp slide or block in a line transverse to the line of clamping pressure.

13. In an electric metal-working apparatus, the combination of a jaw-bearing slide or block, a clamp-jaw detachably secured thereto and adjusting-screws for adjusting the position of the jaw in a direction transverse to the line of clamping pressure.

14. In an electric metal-working apparatus, the combination of a jaw-bearing slide or block, a clamp-jaw detachably secured thereto and adjusting-screws for adjusting the position of the jaw in a direction transverse to the line of pressure applied to the heated work.

15. The combination in an electric metal-working apparatus, of a jaw-bearing block or slide and a clamp-jaw detachably secured thereto and adjustable on said block or slide in a line transverse to the line of pressure applied to the heated work.

16. In an electric metal-working apparatus, the combination with a jaw-bearing block or slide, of a clamp-jaw secured thereto and an adjusting screw or screws carried by the block or slide and engaging said jaw for adjusting it in a line transverse to the line of clamping pressure and the line of pressure applied to the heated work.

17. In an electric metal-working apparatus, a clamp-body carrying clamp-jaws and pivotally mounted on an axis transverse to the axis or line of pressure applied to the heated work.

18. In an electric metal-working apparatus, the combination of a current-carrying platen or block, and a clamp-body pivotally supported thereon and provided with a pair of clamp-jaws for holding the work.

19. In an electric metal-working apparatus, the combination with a current-carrying block or platen, of a clamp-body pivotally mounted thereon, and jaw-carrying slides or blocks mounted on the clamp-body and adapted to apply pressure to the work on the line transverse to the axis on which the clamp-body is pivoted.

Signed at Lynn, in the county of Essex and State of Massachusetts, this 2d day of November, A. D. 1903.

ADOLPH F. RIETZEL.

Witnesses:
C. I. LINDSEY,
E. W. HAWES.